(12) United States Patent
Klein et al.

(10) Patent No.: US 6,398,934 B1
(45) Date of Patent: Jun. 4, 2002

(54) CONCENTRATE SUITABLE FOR THE PREPARATION OF CATHODIC ELECTRODEPOSITION COATING COMPOSITIONS

(75) Inventors: Klausjoerg Klein, Wuppertal (DE); Helmut Hoenig, Kumberg (AT); Georg Pampouchidis, Graz (AT); Herbert Matzer, Graz (AT); Manfred Valtrovic, Graz (AT)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/749,092

(22) Filed: Dec. 27, 2000

Related U.S. Application Data

(63) Continuation of application No. 09/692,032, filed on Oct. 19, 2000.

(51) Int. Cl.$^7$ ............................................. C25D 13/10
(52) U.S. Cl. ...................... 204/480; 204/486; 204/505; 204/506; 523/415
(58) Field of Search ................................ 204/480, 486, 204/505, 506; 523/415

(56) References Cited

U.S. PATENT DOCUMENTS

| 4,596,744 A | 6/1986 | Anderson et al. |
| 4,872,961 A | 10/1989 | McIntyre et al. |
| 5,096,555 A | 3/1992 | Schupp et al. |
| 5,461,091 A | 10/1995 | Hoffmann et al. |
| 5,965,000 A | * 10/1999 | Klein .......................... 204/480 |

FOREIGN PATENT DOCUMENTS

EP         0 199 663         8/1989

* cited by examiner

*Primary Examiner*—Kishor Mayekar
(74) *Attorney, Agent, or Firm*—Steven C. Benjamin

(57) ABSTRACT

A two-component concentrate which includes an aqueous dispersion of a cathodically depositable binder having groups comprising active hydrogen that are cross-linkable using blocked polyisocyanate, as the binder component, and an anhydrous, organic solution of an oxime-blocked isocyanate-functional adduct of aromatic polyisocyanate and at least one compound comprising at least one group capable of addition towards isocyanate and at least one tertiary amino group, as the cross-linking component is used for the preparation of cathodic electrodeposition coating compositions.

16 Claims, No Drawings

CONCENTRATE SUITABLE FOR THE PREPARATION OF CATHODIC ELECTRODEPOSITION COATING COMPOSITIONS

This application is a continuation of co-pending application Ser. No. 09/692,032, filed Oct. 19, 2000, still pending.

FIELD OF THE INVENTION

The invention relates to a concentrate suitable for the preparation of cathodically depositable coating compositions (i.e., cathodic electrodeposition coating compositions) and to the use thereof for the preparation of cathodic electrodeposition ("CED") coating compositions.

BACKGROUND OF THE INVENTION

The majority of the CED coating compositions currently employed contain cathodically depositable binders having functional groups comprising active hydrogen, for example hydroxyl groups, primary and/or secondary amino groups, and blocked polyisocyanates as the cross-linking agents. The CED coating compositions are provided as one- or two-component materials, from which cathodic electrodeposition-baths can either be prepared afresh or a compensation of the solids of cathodic electrodeposition-baths in use can be carried out. The one-component materials are water-containing concentrates containing binders and cross-linking agents and, in general, pigments, whereas two-component materials include an aqueous dispersion containing binders and cross-linking agents and a separate aqueous pigment paste.

For reasons of conserving energy, there has been a desire, in particular in the automotive industry, to obtain CED coating compositions that can be stoved at low temperatures.

CED coating compositions that are curable at a low stoving temperature, which contain cathodically depositable binders that are curable with blocked polyisocyanates, and blocked polyisocyanates having isocyanate groups which are bonded to aromatic rings and are blocked with oximes, as the curing agents, are for example known from EP-A-0 199 663, U.S. Pat. Nos. 4,596,744, 4,872,961, 5,096,555 and 5,461,091. The CED materials disclosed therein are chemically unstable. They undergo to a certain extent a decomposition that surprisingly creates no adverse effects in CED coating, but creates problems during transport and storage of the CED materials. During the decomposition, a pressure build-up occurs within the containers containing the CED coating compositions. The speed of the decomposition process depends in particular on the temperature and may lead to an accelerated pressure build-up at high temperatures. The handling of these CED coating compositions in open containers is not allowed under applicable legal restrictions and also for practical reasons. Although the use of pressure containers or pressure compensation containers could be a possible solution for the problem, these CED coating compositions have not been successful, however, in practice because of the requirements involved.

The object of the invention is to provide CED coating compositions which are curable at a low stoving temperature, and which overcome the aforementioned problems.

SUMMARY OF THE INVENTION

The present invention provides a two-component concentrate suitable for the preparation of cathodic electrodeposition coating compositions, comprising, in combination, (a) a binder component comprising an aqueous dispersion of a CED binder having groups comprising active hydrogen that are cross-linkable using blocked polyisocyanate; and (b) a cross-linking component comprising an anhydrous, organic solution of an oxime-blocked isocyanate-functional adduct of an aromatic polyisocyanate and at least one compound comprising at least one group capable of addition towards isocyanate and at least one tertiary amino group.

DETAILED DESCRIPTION OF THE EMBODIMENTS

The concentrate according to the invention contains a binder component and a cross-linking component. The binder component is an aqueous dispersion of a CED binder having functional groups comprising active hydrogen that can be chemically cross-linked by using the oxime-blocked isocyanate groups of the cross-linking component.

CED binders carry cationic groups or groups able to be converted into cationic groups, e.g. alkaline groups, e.g. amino groups, ammonium groups, for example quaternary ammonium, phosphonium and/or sulphonium groups. Preferred are alkaline groups, in particular preferred are nitrogen-containing alkaline groups, such as amino groups. These groups may be present in quaternised form, or they are converted into cationic groups with a conventional neutralising agent, for example lactic acid, formic acid, acetic acid, methanesulfonic acid. The groups able to be converted into cationic groups may be present in completely or partially neutralised form. They are preferably resins containing amino groups, preferably tertiary amino groups, the total amine value of which is 20 to 150, preferably 50 to 100 mg KOH/g. The total amine value consists in this case of 50 to 100, preferably 80 to 100, in particular preferably 100% of tertiary amino groups. The weight average molecular mass (Mw) of these binders is preferably about 300 to 10000.

The CED binders contain functional groups comprising active hydrogen that can be cross-linked with the oxime-blocked polyisocyanate. Examples of such functional groups are primary amino groups, secondary amino groups and in particular hydroxyl groups. Combinations of these groups may be present in the same CED binder, but preferably there are no primary or secondary amino groups apart from the hydroxyl groups. The proportion of the groups comprising active hydrogen in the CED binders corresponds to an active hydrogen value of 50 to 300 mg KOH/g, corresponding to a sum of primary amine value, secondary amine value and hydroxyl value. The hydroxyl value is generally in the range of 50 to 250 mg KOH/g.

CED binders suitable for use in the present invention are known to the person skilled in the art and are conventional amino(meth)acrylic resins, aminopolyurethane resins, amino group-containing polybutadiene resins, epoxy resin-carbon dioxydeamine-reaction products and in particular aminoepoxy resins, for example aminoepoxy resins having primary OH-groups.

An aqueous dispersion of the CED binders is prepared according to methods known to those skilled in the art. For example, the CED binders may be neutralised with acid and diluted with water. Organic solvents that may be present can be removed (or eliminated) by vacuum distillation or other known method. It is also possible to prepare the CED binder in a way to minimize the presence of organic solvents, such as neutralising with acid in the low-solvent state or as a solvent-free melt and then diluting with water to make the dispersion. In addition, the CED binders can also be neutralised with acid as a solution in an olefinically unsaturated monomer capable of radical polymerisation, and then be converted into an aqueous dispersion by diluting with water, followed by a subsequent total polymerisation of the monomer capable of radical polymerisation.

The cross-linking component of the concentrate according to the invention is an anhydrous, organic solution of an oxime-blocked isocyanate-functional reaction product of aromatic polyisocyanate and at least one compound comprising at least one group capable of addition towards isocyanate and at least one tertiary amino group. The reaction products blocked with oxime are designated in short as "cross-linking agents" herein.

The cross-linking agents are prepared by reacting one or more aromatic polyisocyanates with at least one compound comprising at least one group capable of addition towards isocyanate and at least one tertiary amino group and one or more oximes (as the blocking agents). The reaction can take place at temperatures of 20 to 75° C. as a one-step process or in general as a multi-step process. In a multi-step process, for example, at first an isocyanate-functional reaction product is prepared, the free isocyanate groups of which are blocked with oxime in a subsequent step. Alternatively, at first the aromatic polyisocyanate is partially blocked with oxime prior to the reaction with the further components.

Examples of aromatic polyisocyanates suitable for preparing the cross-linking agents are aromatic diisocyanates (diisocyanates having at least one isocyanate group bonded to an aromatic ring) such as phenylene, toluylene, xylylene or naphthylene diisocyanate and in particular diphenylmethane diisocyanate, each being either in the form of the isomeric mixture or of pure isomers. Further examples are polyisocyanates derived from the aromatic diisocyanates, for example oligomers of the aromatic diisocyanates or isocyanurate or uretdione derivatives of the aromatic diisocyanates or isocyanate-functional adducts of aromatic diisocyanates and polyols or polyamines, such as, for example, trimethylolpropane, 1:1-adducts of dialkanolamines and cyclic carbonate and diethylene triamine.

Examples of compounds comprising at least one group capable of addition towards isocyanate and at least one tertiary amino group are corresponding aminoalcohols, such as dimethyl ethanolamine, dimethyl isopropanolamine, methyl diethanolamine or triethanolamine. Also suitable (and preferred) are polyamines having at least one tertiary amino group and at least one non-tertiary (i.e., primary or secondary) amino group, such as dialkyl aminoalkylamnine, for example diethyl aminopropylamine, dimethyl aminopropylamine and diethyl aminoethylamine.

Examples of oximes suited as the blocking agents are aldoximes or in particular ketoximes such as acetonoxime, cyclohexanonoxime and in particular butanonoxime.

Compounds having at least two groups containing active hydrogen per molecule can optionally be used to prepare the cross-linking agents. Such compounds include polyols, polyamines that contain no tertiary amino groups or aminoalcohols that contain no tertiary amino groups such as ethylene glycol, trimethylolpropane, glycerin, neopentyl glycol, hexanediol, ethylene diamine, diethylene triamine, ethanolamine and methyl ethanolamine.

In a preferred manner, the cross-linking agents comprise 8 to 20 wt-% of isocyanate groups blocked with oxime, calculated as NCO (molecular mass NCO=42), for example corresponding to a number of average 2 to 6 isocyanate groups blocked with oxime per molecule and an amine value of 10 to 50 mg KOH/g. The amine value results in this case from the tertiary amino groups. Hence, the aromatic polyisocyanates, the compounds comprising at least one group capable of addition towards isocyanate and at least one tertiary amino group, the oximes and optionally the compounds having at least two groups containing active hydrogen per molecule are preferably reacted together in such quantity proportions that the cross-linking agents have the aforementioned preferred content of isocyanate groups blocked with oxime and the aforementioned preferred amine value.

The preparation of the cross-linking agents can be carried out without solvents or in the presence of solvent(s) inert towards isocyanate, as the reaction medium. Preferably solvents that are not disturbing or that are even desired in the CED coating compositions, are used. Should an organic solution of the cross-linking agents be prepared which contains solvents that are reactive towards isocyanate, the latter can be added once the synthesis is complete, and any solvents optionally used before as the reaction medium can be removed as carefully as possible, for example by vacuum distillation, until the desired content is achieved.

It is essential to the invention that the cross-linking component is present as an anhydrous organic solution of the cross-linking agents, for example with a solids content of the solution of 50 to 90 wt-%. Examples of suitable organic solvents are solvents conventionally used in CED coating compositions, for example glycol ethers, such as butyl glycol, ethyl glycol, hexyl glycol, methoxypropanol and ethoxypropanol; alcohols, such as butanol and 2-ethylhexanol; ketones, such as methyl isobutylketone, cyclohexanone and methyl ethylketone; propylene carbonate. The cross-linking component is preferably present as a solution in an organic solvent or in a mixture of organic solvents, wherein the solvent (mixture) has a solubility in water of less than 250 g/l water at 20° C.

The cross-linking component can contain the cross-linking agents in a non-neutralised form or preferably in a form neutralised with acid, for example corresponding to a neutralisation degree of 50 to 100%. For this purpose, suitable anhydrous acids can be added to the cross-linking agents in corresponding quantities. Examples of anhydrous acids suitable as neutralising agents are the acids conventionally used in CED coating compositions, for example formic acid, acetic acid and methanesulfonic acid.

The concentrate may also contain pigments, fillers and/or additives (collectively "additives") that are essential to the preparation of CED coating compositions. These additives may be incorporated into the binder and/or isocyanate components of the concentrate, or may be added to the concentrate as separate components. Such separate components may include, for example, pigment pastes and/or filler pastes. The separate components may be added to the concentrate in any suitable water soluble or water-dilutable form known to those skilled in the art (e.g., as such, as an aqueous or organic solution or as an emulsion, for example).

Examples of pigments and fillers are the conventional inorganic and/or organic coloured pigments and/or effect pigments and/or pigments imparting electrical conductivity and/or fillers. These include, for example, titanium dioxide, iron oxide pigments, carbon black, graphite, phthalocyanine pigments, quinacridone pigments, metallic pigments, interferential pigments, kaolin, talcum, silicon dioxide or corrosion protective pigments. Pigment pastes and/or filler pastes can be prepared by dispersing the pigments and/or fillers in the CED binder or preferably in a paste resin and then ground and then mixed to completion with the outstanding portion of the CED binder or paste resin.

Examples of additives are wetting agents, neutralising agents, levelling agents, catalysts, corrosion inhibitors, defoamers, light protecting agents, antioxidants, radical scavengers and conventional anticratering additives.

The components of the concentrate according to the invention are components which are stable when stored, and which are to be stored separately. They can be stored in conventional, closed containers, such as normal barrels or containers. There is no decomposition with gas generation while the components are stored, and hence, no measures against any pressure build-up are required to be taken in the closed containers.

By mixing the binder component, the cross-linking component and optionally further components of the concentrate according to the invention and by diluting with water, CED coating compositions can be prepared that are curable at a low stoving temperature and that have the desired bath-solids content. The preferred proportion between the binder component and the cross-linking component is in this case 60 to 90 solids parts by weight of CED coating binder: 40 to 10 solids parts by weight cross-linking agent.

The components of the concentrate according to the invention can also be used as refill-materials in the course of a compensation of the solids of CED coating-baths which is required on a regular basis. For this purpose the components are mixed with CED coating-bath material which is poor in solids due to a deposit of CED coating and are then added again to the CED coating-bath.

The CED coating compositions to be prepared by using the concentrate according to the invention are conventional aqueous CED coating compositions having a solids content of for example 10 to 30 wt-%. The solids content consists of the resin solid and any pigments, fillers and non-volatile additives that are present. The resin solids include binders and cross-linking agents of the aforementioned binder and cross-linking component, and optionally paste resins. Apart from water and a content of organic solvents of for example 1.5 to 20 wt-%, based on the resin solids content, the CED coating compositions can also contain volatile additives. The ratio by weight of pigment plus filler/resin solids of the CED coating compositions is for example 0:1 to 0.8:1, preferably between 0.05:1 and 0.4:1 for pigmented CED coating compositions. The content of additives in the CED coating compositions is for example 0.1 to 5 wt-%, based on the resin solids content.

CED coating layers can be deposited from the CED coating compositions in conventional manner on electrically conductive substrates, such as, in particular, automotive bodies, and can be stoved at low stoving temperatures of for example 100 to 150° C. object temperature. Higher stoving temperatures of for example up to 200° C. object temperature are of course possible.

The CED coating layers can be deposited as an electrically isolating or electrically conductive primer, in the stoved state, on metallic substrates or as an intermediate or top layer on substrates that have been provided with an electrically conductive precoating, for example with an electrically conductive electro-dip primer. The CED coating layers can be stoved separately or together with one or more coating layers that are applied subsequently. Examples of subsequently applied coating layers are coating layers that are applied by spraying, for example primer surfacer, base coat or top coat layers. A subsequently applied coating layer can also be a coating layer that is applied by electrodeposition, if the CED coating layer applied and stoved beforehand has a sufficient electrical conductivity.

EXAMPLES

Example 1
(Preparation of an Aqueous Dispersion of a CED Binder)

A mixture of 666 g methoxypropanol, 319 g bisphenol A, 591 g of an adduct of 2 mol epoxy resin (based on bisphenol A/epichlorhydrine; epoxy equivalent weight 190) and 1 mol polypropylene glycol 400 and 886 g epoxy resin (based on bisphenol A/epichlorhydrine; epoxy equivalent weight 190) was heated to 45° C. and stirred for 1 hour. 121 g diethanolamine and 81.5 g dimethyl aminopropylamine were then added and the batch was stirred for 2 hours at 125° C. The methoxypropanol was then distilled off under vacuum and the batch was diluted with 240 g hexyl glycol. After cooling to 95° C. and stirring for 30 minutes at 95° C., 48 g aqueous formic acid at 50 wt-% were added and the batch was stirred for 30 minutes. The batch was then converted into an aqueous dispersion having a solids content of 37.5 wt-% by adding deionised water. The amine value of the aminoepoxy resin was 77 mg KOH/g, based on the solids. The acid content of the dispersion was 26 mEq/100 g solids.

Example 2
(Preparation of an Anhydrous Solution of a Cross-linking Agent)

750 g Desmodur® VL (from Bayer, polyisocyanate based on diphenylmethane diisocyanate having a NCO-content of 33.6 wt-%) were dissolved in 317 g methyl isobutylketone and 405 g butanonoxime were added evenly at 25° C. while stirring and cooling, wherein a temperature of 35° C. was not exceeded. 52 g of an adduct of 1 mol propylene carbonate and 1 mol diethanolamine were then added over a period of 30 minutes, wherein the temperature rose to 60° C. 61 g dimethyl aminopropylamine were added while further stirring, cooling and keeping a temperature not exceeding 75° C. The batch was stirred for 1 hour. The batch was then diluted with 218 g propylene carbonate and neutralised while adding 34.2 g pure acetic acid. A 69 wt-% solution of a cross-linking agent having an amine value of 26.5 mg KOH/Jg, based on the solids, was obtained. The acid content of the solution was 44 mEq/100 g solids, corresponding to a neutralisation degree of 93%.

Example 3
(Preparation of a CED Clear Coat)

The binder dispersion from Example 1 was mixed with the solution of the cross-linking agent from Example 2 in a solids weight ratio of 70 parts binder: 30 parts cross-linking agent (mixture A). This mixture was diluted with deionised water to a CED clear coat having a solids content of 20 wt-%. CED coatings were deposited in the conventional manner from the thus prepared CED clear coat-bath onto test sheets of bodywork steel and were stoved as gradient sheets. Satisfactory cross-linking started at 110° C. (20 min object temperature).

1 liter of the mixture A from Example 3 was filled into a two-liter-plastic bottle which was closed thereafter. After a storage period of two days at room temperature the plastic bottle was clearly distended.

The CED coating dispersion of Example 1 that had been stored separately at room temperature and the solution of the cross-linking agent from Example 2 each remained unchanged after a storage period of three months and could be mixed, as described in Example 3, to give a CED clear coat-bath having the same coating properties as that of Example 3.

What is claimed is:

1. A two-component concentrate suitable for the preparation of cathodic electrodeposition coating compositions, said concentrate comprising, in combination:
   a) a binder component comprising an aqueous dispersion of a cathodic electrodeposition binder having groups comprising active hydrogen, said groups being cross-linkable with a blocked polyisocyanate; and
   b) a cross-linking component comprising an anhydrous, organic solution of an oxime-blocked isocyanate-functional adduct of an aromatic polyisocyanate and at least one compound comprising at least one group capable of addition towards isocyanate and at least one tertiary amino group.

2. The concentrate of claim 1, wherein the cathodic electrodeposition binder is selected from the group consisting of amino(meth)acrylic resins, aminopolyurethane resins, amino group containing polybutadiene resins, epoxy resin-carbon dioxide-amine reaction products and aminoepoxy resins.

3. The concentrate of claim 1, wherein the cathodic electrodeposition binder carries tertiary amino groups and optionally amino groups selected from the group consisting of primary amino groups, secondary amino groups, and combinations thereof and wherein the amino groups correspond to a total amine value of 20 to 150 mg KOH/g.

4. The concentrate of claim 1, wherein the cathodic electrodeposition binder has an active hydrogen value of 50 to 300 mg KOH/g.

5. The concentrate of claim 1, wherein the cathodic electrodeposition binder has a hydroxyl value of 50 to 250 mg KOH/g.

6. The concentrate of claim 1, wherein the aromatic polyisocyanate is selected from the group consisting of diphenylmethane diisocyanate, polyisocyanates derived from diphenylmethane diisocyanate and combinations thereof.

7. The concentrate of claim 1, wherein the compounds comprising a group capable of addition towards isocyanate and at least one tertiary amino group are selected from the group consisting of aminoalcohols, polyamines and combinations thereof.

8. The concentrate of claim 1, wherein the oxime-blocked isocyanate-functional adduct has a content of isocyanate groups blocked with oxime of 8 to 20 wt-%, calculated as NCO, and an amine value of 10 to 50 mg KOH/g.

9. The concentrate of claim 1, wherein the cross-linking component is neutralized with acid.

10. The concentrate of claim 1, wherein the cross-linking component is an anhydrous organic solution having a solids content of 50 to 90 wt-%.

11. The concentrate of claim 1, wherein the cross-linking component is present as a solution in at least one organic solvent having a solubility in water of less than 250 g/l water at 20° C.

12. The concentrate of claim 1, further comprising at least one additive selected from the group consisting of pigments, fillers, and additives conventionally used in cathodic electrodeposition coating compositions.

13. The concentrate of claim 12, wherein the at least one additive is present in the concentrate as a component separate from the binder component and separate from the cross-linking component.

14. A process for compensating the solids of a cathodic electrodeposition coating bath, comprising the steps of adding the components of the concentrate of claim 1 to the bath as refill material.

15. A method for forming a cathodic electrodeposition coating composition which comprises diluting the two component concentrate of claim 1 with water.

16. A method for forming a cathodic electrodeposition coating composition which comprises diluting the two component concentrate of claim 1 with water to a solids content of 10 to 30 wt-%.

* * * * *

(12) EX PARTE REEXAMINATION CERTIFICATE (5368th)
United States Patent
Klein et al.

(10) Number: US 6,398,934 C1
(45) Certificate Issued: May 9, 2006

(54) CONCENTRATE SUITABLE FOR THE PREPARATION OF CATHODIC ELECTRODEPOSITION COATING COMPOSITIONS

(75) Inventors: Klausjoerg Klein, Wuppertal (DE); Helmut Hoenig, Kumberg (AT); Georg Pampouchidis, Graz (AT); Herbert Matzer, Graz (AT); Manfred Valtrovic, Graz (AT)

(73) Assignee: E. I. Du Pont de Nemours and Company, Wilmington, DE (US)

Reexamination Request:
No. 90/006,641, May 16, 2003

Reexamination Certificate for:
Patent No.: 6,398,934
Issued: Jun. 4, 2002
Appl. No.: 09/749,092
Filed: Dec. 27, 2000

Related U.S. Application Data

(63) Continuation of application No. 09/692,032, filed on Oct. 19, 2000, now abandoned.

(51) Int. Cl.
*C25D 13/10* (2006.01)

(52) U.S. Cl. .................. 204/480; 204/486; 204/505; 204/506; 523/415

(58) Field of Classification Search .................. 204/480, 204/486, 505, 506; 523/415
See application file for complete search history.

(56) References Cited

U.S. PATENT DOCUMENTS

| | | | |
|---|---|---|---|
| 4,684,702 A | | 8/1987 | Paar et al. |
| 4,940,768 A | * | 7/1990 | Honel et al. .................. 528/45 |
| 5,264,497 A | | 11/1993 | Hönig et al. |
| 5,461,091 A | | 10/1995 | Hoffmann et al. |
| 5,525,666 A | | 6/1996 | Hoenel et al. |
| 6,395,162 B1 | * | 5/2002 | Watanabe et al. ............. 205/50 |

FOREIGN PATENT DOCUMENTS

EP      0 424 713 A      5/1991

\* cited by examiner

*Primary Examiner*—Arun S. Phasge

(57) ABSTRACT

A two-component concentrate which includes an aqueous dispersion of a cathodically depositable binder having groups comprising active hydrogen that are cross-linkable using blocked polyisocyanate, as the binder component, and an anhydrous, organic solution of an oxime-blocked isocyanate-functional adduct of aromatic polyisocyanate and at least one compound comprising at least one group capable of addition towards isocyanate and at least one tertiary amino group, as the cross-linking component is used for the preparation of cathodic electrodeposition coating compositions.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 8 is cancelled.

Claim 1 is determined to be patentable as amended.

Claims 2–7 and 9–16, dependent on an amended claim, are determined to be patentable.

1. A two-component concentrate suitable for the preparation of cathodic electrodeposition coating compositions, said concentrate comprising, in combination:

a) a binder component comprising an aqueous dispersion of a cathodic electrodeposition binder having groups comprising active hydrogen, said groups being cross-linkable with a blocked polyisocyanate; and b) a cross-linking component comprising an anhydrous, organic solution of an oxime-blocked isocyanate-functional adduct of an aromatic polyisocyanate and at least one compound comprising at least one group capable of addition towards isocyanate and at least one tertiary amino group; *wherein the oxime-blocked isocyanate-functional adduct has a content of isocyanate groups blocked with oxime of 8 to 20 wt-%, calculated as NCO, and an amine value of 10 to 50 mg KOH/g.*

* * * * *